United States Patent
Nagashima

(10) Patent No.: US 8,860,983 B2
(45) Date of Patent: Oct. 14, 2014

(54) INFORMATION PROCESSING APPARATUS, INFORMATION PROCESSING METHOD, AND PROGRAM

(75) Inventor: Takeyuki Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 12/858,806

(22) Filed: Aug. 18, 2010

(65) Prior Publication Data

US 2011/0043856 A1 Feb. 24, 2011

(30) Foreign Application Priority Data

Aug. 24, 2009 (JP) ................................. 2009-193650

(51) Int. Cl.
*G06F 3/12* (2006.01)
*G06F 9/44* (2006.01)
*G06F 3/048* (2013.01)

(52) U.S. Cl.
CPC ............ *G06F 3/1285* (2013.01); *G06F 3/1225* (2013.01); *G06F 9/4411* (2013.01); *G06F 3/1203* (2013.01)
USPC ........................... 358/1.15; 358/1.13; 715/777

(58) Field of Classification Search
CPC ............ G06F 3/12; G06F 3/1201; G06F 3/14
See application file for complete search history.

(56) References Cited

U.S. PATENT DOCUMENTS

| | | | | |
|---|---|---|---|---|
| 5,165,014 | A * | 11/1992 | Vassar | 358/1.13 |
| 7,359,081 | B2 * | 4/2008 | Wanda et al. | 358/1.15 |
| 7,593,123 | B2 * | 9/2009 | Sugahara | 358/1.14 |
| 7,620,960 | B2 | 11/2009 | Nagashima | |
| 2007/0019236 | A1 * | 1/2007 | Sando | 358/1.15 |
| 2008/0148294 | A1 * | 6/2008 | Suzuki | 719/321 |
| 2008/0201714 | A1 | 8/2008 | Nagashima | |
| 2008/0259397 | A1 * | 10/2008 | Uehara | 358/1.15 |
| 2009/0237724 | A1 * | 9/2009 | Furuya | 358/1.15 |

FOREIGN PATENT DOCUMENTS

JP 2008-203929 A 9/2008
JP 2008-203930 A 9/2008

* cited by examiner

*Primary Examiner* — Fred Guillermety
*Assistant Examiner* — Henok A Shiferaw
(74) *Attorney, Agent, or Firm* — Canon USA, Inc. IP Division

(57) ABSTRACT

An information processing apparatus is used in a network environment including a plurality of printing apparatuses and a plurality of client devices which form printing data for realizing a printing processing in the plurality of printing apparatuses. Regarding an association between printing apparatus and driver constituting a selection unit at the time of distributing drivers corresponding to the printing apparatuses, from the information processing apparatus to the client devices, it is possible to prepare and select associations of [N:1], [1:N], and [N:N]. As a result, it is possible to mitigate erroneous association selection and to achieve further simplification in procedures at the time of selection, which leads to a reduction in total cost of ownership (TCO).

18 Claims, 22 Drawing Sheets

FIG.3

| Device Name | Product Name | IP Address | PDL | Location |
|---|---|---|---|---|
| Device A | Product A | 111.222.333.1 | PCL/PS | Room A-1 |
| Device B | Product B | 111.222.333.2 | PCL | Room A-2 |
| Device C | Product B | 111.222.333.3 | PCL | Room A-3 |
| Device D | Product B | 111.222.333.4 | PCL | Room A-4 |

FIG.4

| Driver Set Name | Driver Name | Driver Version | PDL | Language |
|---|---|---|---|---|
| Driver Set A | PCL Driver for Product A | 1.00 | PCL | English |
| Driver Set A | PCL Driver for Product B | 1.00 | PCL | English |
| Driver Set B | PS Driver for Product A | 2.00 | PS | English |

FIG.5A

Printer Folder

| | Printer Name | Driver Name | Driver Virsion | Output Device |
|---|---|---|---|---|
| | PCL Driver for Device B – Room A-2 | PCL Driver for Product B | 1.00 | Device B |
| | PCL Driver for Device C – Room A-3 | PCL Driver for Product B | 1.00 | Device C |
| | PCL Driver for Device D – Room A-4 | PCL Driver for Product B | 1.00 | Device D |

FIG.5B

Printer Folder

| | Printer Name | Driver Name | Driver Virsion | Output Device |
|---|---|---|---|---|
| | PCL Driver for Device A – Room A-1 | PCL Driver for Product A | 1.00 | Device A |
| | PS Driver for Device A – Room A-1 | PS Driver for Product A | 2.00 | Device A |
| | | | | |

FIG.5C

Printer Folder

| | Printer Name | Driver Name | Driver Virsion | Output Device |
|---|---|---|---|---|
| | PCL Driver for Device A – Room A-1 | PCL Driver for Product A | 1.00 | Device A |
| | PS Driver for Device A – Room A-1 | PS Driver for Product A | 2.00 | Device A |
| | PCL Driver for Device B – Room A-2 | PCL Driver for Product B | 1.00 | Device B |

FIG.9A

Associate Device and Driver

[STEP1] Select Devices

| | Device Name | Product Name | PDL | Location | IP Address |
|---|---|---|---|---|---|
| ☐ | Device A | Product A | PCL / PS | Room A-1 | 111.222.333.1 |
| ☑ | Device B | Product B | PCL | Room A-2 | 111.222.333.2 |
| ☑ | Device C | Product B | PCL | Room A-3 | 111.222.333.3 |
| ☑ | Device D | Product B | PCL | Room A-4 | 111.222.333.4 |

Next >   Cancel

FIG.9B

Associate Device and Driver

[STEP1] Select Devices

| | Device Name | Product Name | PDL | Location | IP Address |
|---|---|---|---|---|---|
| ☑ | Device A | Product A | PCL / PS | Room A-1 | 111.222.333.1 |
| ☐ | Device B | Product B | PCL | Room A-2 | 111.222.333.2 |
| ☐ | Device C | Product B | PCL | Room A-3 | 111.222.333.3 |
| ☐ | Device D | Product B | PCL | Room A-4 | 111.222.333.4 |

Next >   Cancel

FIG.9C

Associate Device and Driver

[STEP1] Select Devices

| | Device Name | Product Name | PDL | Location | IP Address |
|---|---|---|---|---|---|
| ☒ | Device A | Product A | PCL / PS | Room A-1 | 111.222.333.1 |
| ☒ | Device B | Product B | PCL | Room A-2 | 111.222.333.2 |
| ☐ | Device C | Product B | PCL | Room A-3 | 111.222.333.3 |
| ☐ | Device D | Product B | PCL | Room A-4 | 111.222.333.4 |

Next >  Cancel

FIG.10A

Associate Device and Driver

[STEP2] Select Drivers

| | Driver Name | Version | PDL | Language | Driver Set Name |
|---|---|---|---|---|---|
| ○ | PCL Driver for Product A | 1.00 | PCL | English | Driver Set A |
| ⊙ | PCL Driver for Product B | 1.00 | PCL | English | Driver Set A |
| ○ | PS Driver for Product A | 2.00 | PS | English | Driver Set B |

< Back    Next >    Cancel

FIG.10B

Associate Device and Driver

[STEP2] Select Drivers

| | Driver Name | Version | PDL | Language | Driver Set Name |
|---|---|---|---|---|---|
| ☑ | PCL Driver for Product A | 1.00 | PCL | English | Driver Set A |
| ☐ | PCL Driver for Product B | 1.00 | PCL | English | Driver Set A |
| ☑ | PS Driver for Product A | 2.00 | PS | English | Driver Set B |

< Back    Next >    Cancel

FIG.10C

Associate Device and Driver

[STEP2] Select Drivers

⟨ Back    Next ⟩    Cancel

Device A    Device B

| | Driver Name | Version | PDL | Language | Driver Set Name |
|---|---|---|---|---|---|
| ☑ | PCL Driver for Product A | 1.00 | PCL | English | Driver Set A |
| ☐ | PCL Driver for Product B | 1.00 | PCL | English | Driver Set A |
| ☑ | PS Driver for Product A | 2.00 | PS | English | Driver Set B |

FIG.10D

Associate Device and Driver

[STEP2] Select Drivers

⟨ Back    Next ⟩    Cancel

Device A    Device B

| | Driver Name | Version | PDL | Language | Driver Set Name |
|---|---|---|---|---|---|
| ☐ | PCL Driver for Product A | 1.00 | PCL | English | Driver Set A |
| ☑ | PCL Driver for Product B | 1.00 | PCL | English | Driver Set A |
| ☐ | PS Driver for Product A | 2.00 | PS | English | Driver Set B |

FIG.11A

| Associate Device and Driver | | | |
|---|---|---|---|
| [STEP3] Association Settings | | | |

[ < Back ]  [ Next > ]  [ Cancel ]

Set Association Name

| | Association Name | Room A-1/A-2/A-3 – Product B |
|---|---|---|

Printer Settings

| Device Informations | Driver Information | | |
|---|---|---|---|
| Device Name | Driver Name | Printer Name | Port Name |
| Device B | PCL Driver for Product B | PCL Driver for Device B- Room A-2 | IP_111.222.333.2 |
| Device C | | PCL Driver for Device C- Room A-3 | IP_111.222.333.3 |
| Device D | | PCL Driver for Device D- Room A-4 | IP_111.222.333.4 |

FIG.11B

| Associate Device and Driver | | | |
|---|---|---|---|
| [STEP3] Association Settings | | | |

[ < Back ]  [ Next > ]  [ Cancel ]

Set Association Name

| | Association Name | Room A-1 – Product A-Device A |
|---|---|---|

Printer Settings

| Device Informations | Driver Information | | |
|---|---|---|---|
| Device Name | Driver Name | Printer Name | Port Name |
| Device A | PCL Driver for Product A | PCL Driver for Device A- Room A-1 | IP_111.222.333.1 |
| | PS Driver for Product A | PS Driver for Device A- Room A-1 | |

FIG.11C

| Associate Device and Driver | | | | |
|---|---|---|---|---|
| [STEP3] Association Settings | | | | |

< Back | Next > | Cancel

Set Association Name

| Association Name | Room A-1- Device A & Room A-2 - Device B |
|---|---|

Printer Settings

| Device Informations | Driver Information | | |
|---|---|---|---|
| Device Name | Driver Name | Printer Name | Port Name |
| Device A | PCL Driver for Product A | PCL Driver for Device A- Room A-1 | IP_111.222.333.1 |
| | PS Driver for Product A | PS Driver for Device A- Room A-1 | |
| Device B | PCL Driver for Product B | PCL Driver for Device B- Room A-2 | IP_111.222.333.2 |

FIG.12A

| Associate Device and Driver | | | | | | | | |
|---|---|---|---|---|---|---|---|---|
| [STEP4] Confirm Registration Settings | | | | | | | | |
| | | | | | < Back | Register | Cancel | |
| Set Association Name | | | | | | | | |
| Associat on Name | Room A-1/A-2/A-3 - Product B | | | | | | | |
| Printer Settings | | | | | | | | |
| Device Information | | | | Driver Information | | | | |
| Device Name | Product Name | PDL | Location | Printer Name | Driver Name | Driver Set Name | Port Name | |
| Device B | Product B | PCL | Room A-1 | PCL Driver for Device B - Room A-2 | PCL Driver for Product B | Driver Set A | IP_111.222.333.2 | |
| Device C | | | Room A-2 | PCL Driver for Device C - Room A-3 | | | IP_111.222.333.3 | |
| Device D | | | Room A-3 | PCL Driver for Device D - Room A-4 | | | IP_111.222.333.4 | |

FIG.12B

| Associate Device and Driver | | | | | | | |
|---|---|---|---|---|---|---|---|
| [STEP4] Confirm Registration Settings | | | | | | | |
| | | | | | < Back | Register | Cancel |
| Set Association Name | | | | | | | |
| Associat on Name | Room A-1 - Product B - Device A | | | | | | |
| Printer Settings | | | | | | | |
| Device Information | | | | Driver Information | | | |
| Device Name | Product Name | PDL | Location | Printer Name | Driver Name | Driver Set Name | Port Name |
| Device A | Product A | PCL/PS | Room A-1 | PCL Driver for Device A - Room A-1 | PCL Driver for Product B | Driver Set A | IP_111.222.333.1 |
| | | | | PS Driver for Device A - Room A-1 | PS Driver for Product A | Driver Set B | |

FIG.12C

| Associate Device and Driver | | | | | | | | |
|---|---|---|---|---|---|---|---|---|
| [STEP4] Confirm Registration Settings | | | | | | | | |
| | | | | | < Back | Register | Cancel | |
| Set Association Name | | | | | | | | |
| | Association Name | Room A-1- Device A & Room A-2 Device B | | | | | | |
| Printer Settings | | | | | | | | |
| | Device Information | | | | Driver Information | | | |
| | Device Name | Product Name | PDL | Location | Printer Name | Driver Name | Driver Set Name | Port Name |
| | Device A | Product A | PCL /PS | Room A-1 | PCL Driver for Device A - Room A-1 | PCL Driver for Product A | Driver Set A | IP_111.222.333.1 |
| | | | | | PS Driver for Device A - Room A-1 | PS Driver for Product A | Driver Set B | |
| | Device B | Product B | PCL | Room A-2 | PCL Driver for Device B - Room A-2 | PCL Driver for Product B | Driver Set A | IP_111.222.333.2 |

FIG.13A

| | Association Name | Device Information | | | | Driver Information | | | |
|---|---|---|---|---|---|---|---|---|---|
| | | Device Name | Product Name | PDL | Location | Printer Name | Driver Name | Driver Set Name | Port Name |
| ☑ | Room-A-1/A-2/A-3-Product B | Device B | Product B | PCL | Room A-1 | PCL Driver for Device B- Room A-2 | PCL Driver for Product B | Driver Set A | IP_111.222.333.2 |
| | | Device C | | | Room A-2 | PCL Driver for Device C- Room A-3 | | | IP_111.222.333.3 |
| | | Device D | | | Room A-3 | PCL Driver for Device D- Room A-4 | | | IP_111.222.333.4 |

Create Driver Distribution Task — Select Associations — < Back | Register | Cancel

FIG.13B

Associate Device and Driver — [STEP4] Cofirm Registration Settings — < Back | Register | Cancel

| | Association Name | Device Information | | | | Driver Information | | | |
|---|---|---|---|---|---|---|---|---|---|
| | | Device Name | Product Name | PDL | Location | Printer Name | Driver Name | Driver Set Name | Port Name |
| ☑ | Room-A-1-Product B- Device A | Device A | Product A | PCL/RS | Room A-1 | PCL Driver for Device A- Room A-1 | PCL Driver for Product B | Driver Set A | IP_111.222.333.1 |
| | | | | | | PS Driver for Device A- Room A-1 | PS Driver for Product A | Driver Set B | |

FIG.13C

| | Association Name | Device Information | | | | Driver Information | | | |
|---|---|---|---|---|---|---|---|---|---|
| | | Device Name | Product Name | PDL | Location | Printer Name | Driver Name | Driver Set Name | Port Name |
| ☑ | Room-A-1-Device A & Room A-2-Device B | Device A | Product A | PCL /PS | Room A-1 | PCL Driver for Device A- Room A-1 | PCL Driver for Product A | Driver Set A | IP_111.222.333.1 |
| | | | | | | PS Driver for Device A- Room A-1 | PS Driver for Product A | Driver Set B | |
| | | Device B | Product B | PCL | Room A-2 | PCL Driver for Device B- Room A-2 | PCL Driver for Product B | Driver Set A | IP_111.222.333.2 |

Associate Device and Driver

[STEP4] Cofrm Registration Settings

< Back | Register | Cancel

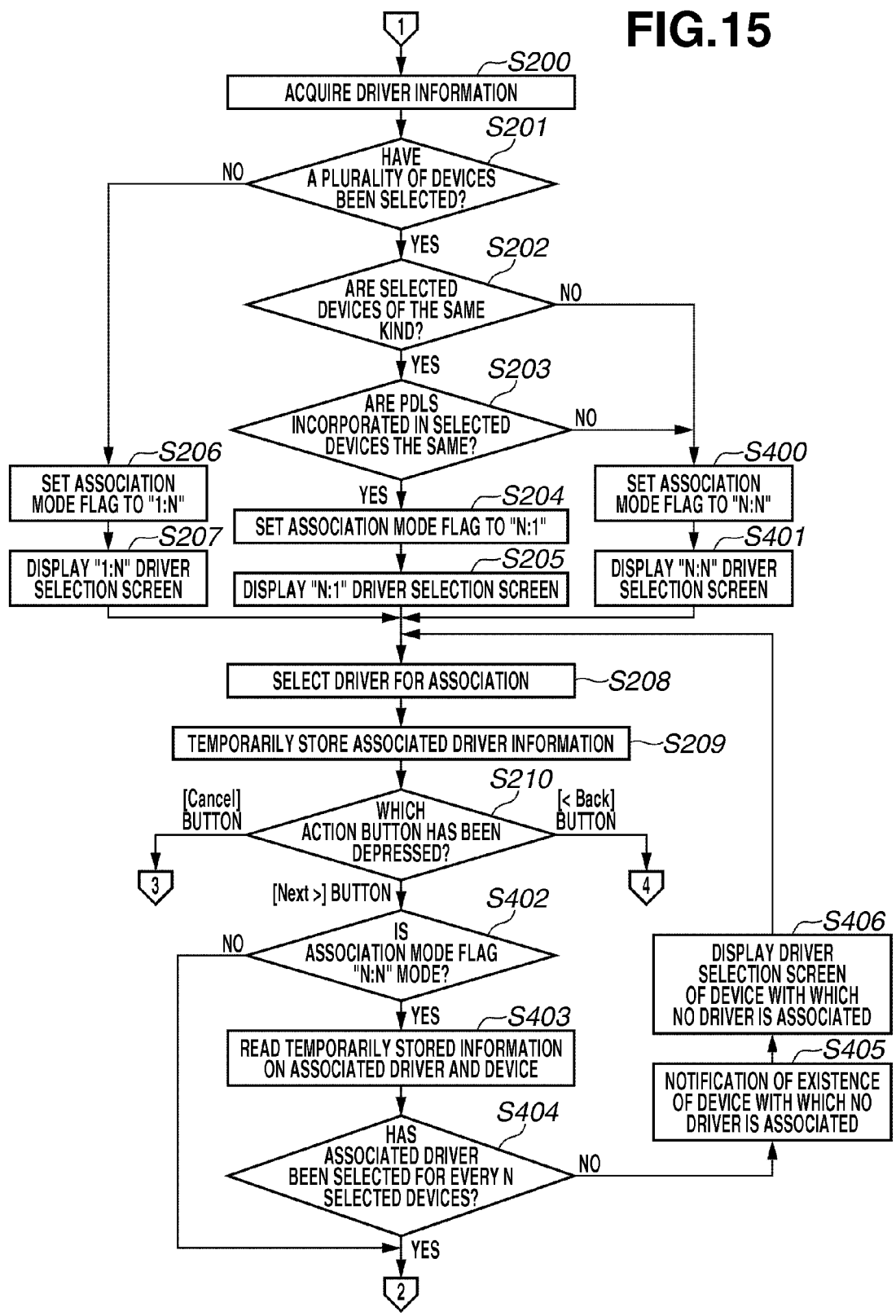

INFORMATION PROCESSING APPARATUS, INFORMATION PROCESSING METHOD, AND PROGRAM

BACKGROUND OF THE INVENTION

1. Field of the Invention

The present invention relates to a technique for installing a device driver in a client device.

2. Description of the Related Art

Conventionally, when distributing a driver from an administration server to a client device, a task is formed by an association of the client device in a distribution destination, a printing apparatus, and the driver. By executing this task, the driver is installed in the client device (See, for example, Japanese Patent Application Laid-Open No. 2008-203929 and Japanese Patent Application Laid-Open No. 2008-203930.

Here, a driver means a piece of software forming printing data for realizing printing in a printing apparatus of a client device, i.e., a so-called printer driver. Hereinafter, it will be simply referred to as the driver. An association is an item of information composed of device information and driver information. Device information means information enabling the identification and selection of an arbitrary printing apparatus (device) from among a plurality of printing apparatuses (devices) for performing printing from a printing apparatus, such as printing apparatus name, product name, location, and IP address. Driver information means information enabling the identification and selection of an arbitrary driver from among a plurality of drivers, such as driver name, printer name, version, and language.

If an association between device information and driver information are previously established, when distributing a driver to a client device, association information prepared is selected without selecting a printing apparatus and a driver each time, so that an appropriate installation of the driver is realized in the client device. In conventional art, the association relationship between a printing apparatus and a driver is a [1:1] relationship, in which one driver is associated with one printing apparatus.

The above-described conventional technique involves the following problems when preparing in an administration server a task for installing an appropriate driver in a client device. Suppose, for example, there are four printing apparatuses in a network administered by an administration server, and the respective names of the printing apparatuses are Device A, Device B, Device C, and Device D. Suppose, further, Device B, Device C, and Device D are the same products. Each printing apparatus is provided with a page definition language (PDL) for realizing printing, and the driver to be used normally differs depending on the PDL. Here, Device A is equipped with printer control language (PCL) and postscript (PS) as the PDLs, and Device B, Device C, and Device D are solely equipped with PCL. Printer control language (PCL) and Postscript (PS) are well-known PDLs; the former is a PDL manufactured by Hewlett-Packard (HP), and the latter is a PDL manufactured by Adobe. It is also well known that various PDLs are provided by manufacturer-vendors of printing apparatuses. In installing a driver for such a printing apparatus in a client device, the following cases are imaginable.

(1) In the case of a client device which solely uses Device A and which uses PCL and PS as appropriate, it is necessary to install a PCL driver compatible with Device A and to install a PS driver compatible with Device A.

(2) In the case of a client device which uses Device B, Device C, and Device D as appropriate, it is necessary to produce out of a single PCL driver three printers whose output ports differ from device to device. Here, in the case, for example, of Windows Operating System (OS) (registered trademark), the three printers refer to printers allowing checking with a printer folder.

(3) In the case of a client device which uses Device A and Device B as appropriate and which uses PCL and PS as appropriate with respect to Device A, a PCL driver compatible with Device A, a PS driver compatible with Device A, and a PCL driver compatible with Device B are installed.

In thus utilizing association when preparing a task for installing a driver from an administration server in a client device on the assumption that a plurality of PDLs and devices are used as appropriate in the client device, the following measures must be taken:

In the above case (1), it is necessary to previously prepare an association of Device A and a PCL driver compatible with Device A, and an association of Device A and a PS driver compatible with Device A. Therefore, each association needs to be selected when preparing a task.

In the above case (2), it is necessary to previously prepare an association of Device A and a PCL driver compatible with Device A, an association of a PCL driver compatible with Device B, and an association of a PCL driver compatible with Device C. Then, each association needs to be selected at the time of preparing a task.

In the above case (3), it is necessary to previously prepare an association of Device A and a PCL driver compatible with Device A, an association of Device A and a PS driver compatible with Device A, and an association of Device B and a PCL driver compatible with Device B. Then, each association needs to be selected at the time of preparing a task.

In any case, in the conventional technique to establish a [1:1] association between a printing apparatus and a driver, it is necessary to previously prepare a plurality of associations although a single printing apparatus is used, and to previously prepare a plurality of associations although a single driver is used. As a result, when preparing a task for installing a driver in a client device, there is a possibility of erroneous selection because it is necessary to select a plurality of associations, and a problem arises in terms of usability due to the bothersome selection. Further, this leads to an increase in total cost of ownership (TCO).

SUMMARY OF THE INVENTION

According to an aspect of the present invention, an information processing apparatus includes: a printing apparatus selection unit for selecting an arbitrary printing apparatus from among a plurality of printing apparatuses; a selected printing apparatus number determining unit for determining whether a number of selected printing apparatuses is plural or singular; a value setting unit for setting a value to associate a selected printing apparatus with a printing language when the number is singular; a driver selection unit for selecting a driver with respect to the selected printing apparatus; an information setting unit for setting information based on the selected driver; and a client device selection unit for selecting a client device in which driver information is to be installed by referring to the set value and the set information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a table showing an example of device information.

FIG. 4 is a table showing an example of driver information.

FIGS. 5A, 5B, and 5C are diagrams illustrating an example of a screen displayed on a third display unit of a client device.

FIGS. 9A, 9B, and 9C are diagrams illustrating a device selection screen for association preparation.

FIGS. 10A, 10B, 10C, and 10D are diagrams illustrating a driver selection screen for association preparation.

FIGS. 11A, 11B, and 11C are diagrams illustrating an association information setting screen for association preparation.

FIGS. 12A, 12B, and 12C are diagrams illustrating an association setting checking screen for association preparation.

FIGS. 13A, 13B, and 13C are diagrams illustrating an association selection screen.

FIG. 15 is a flowchart illustrating control procedures for the information processing apparatus.

DESCRIPTION OF THE EMBODIMENTS

Various exemplary embodiments, features, and aspects of the invention will be described in detail below with reference to the drawings.

Figure 1:
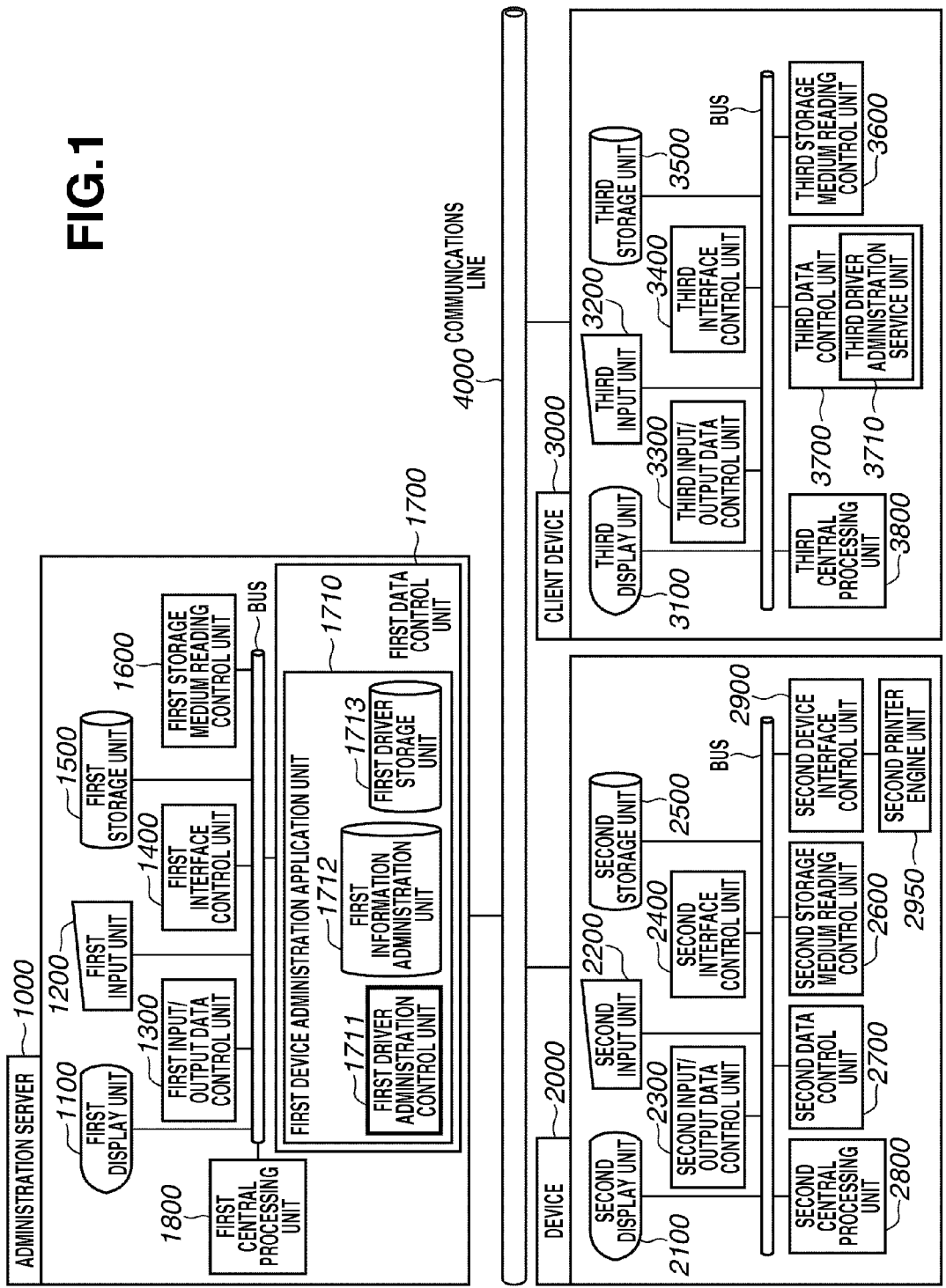
FIG. 1 is a diagram illustrating the system configuration of a printing system.

First, an operation example of an information processing apparatus (administration server) according to a first exemplary embodiment will be illustrated. FIG. 1 is a diagram illustrating the system configuration of a printing system equipped with an information processing apparatus (administration server) according to the first exemplary embodiment. This printing system includes an administration server 1000, a device 2000, and a client device 3000. The administration server 1000, the device 2000, and the client device 3000 are connected to each other by a communications line 4000. The administration server 1000, the device 2000, and the client device 3000 are respectively provided with a first central processing unit 1800, a second central processing unit 2800, and a third central processing unit 3800 each performing various kinds of processing. The above system programs, application programs, and related data are recorded on recording media, such as a floppy disk (FD), a compact disc-read-only memory (CD-ROM), a read-only memory (ROM), a digital versatile disk (DVD), a magnetic tape, and an IC memory card. The programs, etc. are read from a first storage medium reading control unit 1600, a second storage medium reading control unit 2600, and a third storage medium reading control unit 3600.

Next, the system programs and application programs that have been read are loaded into a first data control unit 1700, a second data control unit 2700, and a third data control unit 3700, which include non-volatile random access memory (NVRAM) or the like. The data utilized by the system programs and application programs in the first data control unit 1700, the second data control unit 2700, and the third data control unit 3700 is stored for use in a first storage unit 1500, a second storage unit 2500, and a third storage unit 3500. The first storage unit 1500, the second storage unit 2500, and the third storage unit 3500 may be formed by memory, hard disk drives (HDD), or magneto-optical disks or a combination of these.

And, the system programs or application programs process the information input from a first display unit 1100, a second display unit 2100, a third display unit 3100, a first input unit 1200, a second input unit 2200, and a third input unit 3200. The input/output of each item of data is effected via a first interface control unit 1400, a second interface control unit 2400, and a third interface control unit 3400. The first display unit 1100, the second display unit 2100, and the third display unit 3100 are formed by display devices such as liquid crystal displays or cathode-ray tube (CRT) displays. The first input unit 1200, the second input unit 2200, and the third input unit 3200 are formed by input devices such as keyboards and mice.

The device 2000 is a printing apparatus realizing a printing processing function via a second device interface control unit 2800 and a second printer engine unit 2900. The device 2000 may be a single function printer (SFP) having a printing function only, or a multi-function printer (MFP) having, in addition to the printing function, a scanning function, a copying function, a facsimile function, etc. The device 2000 retains device information such as management information base (MIB), and the value thereof can be acquired and set via the communications line 4000 from an external terminal of the administration server 1000 or the like.

In the client device 3000, it is possible to perform printing by a local printer or a network connection printer by using an application. Here, the expression: "printing from a local printer" means a system in which printing data is directly sent from the client device 3000 to the device 2000. On the other hand, the expression: "printing from a network connection printer" means a system in which printing data is sent from the client device 3000 via a shared printer in a print server corresponding to the network connection printer. As the communications line 4000, the use of a two-way serial interface, such as an ordinary local-area network (LAN), IEEE (Institute of Electrical and Electronics Engineers) 1394, or a universal serial bus (USB), is assumed.

Next, the function of a main portion of the administration server 1000 will be described. The administration server 1000 is mainly controlled by a first driver administration control unit 1711 in a first device administration application unit 1710. The first device administration application unit 1710 and the first driver administration control unit 1711 are operated in the first data control unit 1700 consisting of NVRAM or the like. Apart from the first driver administration control unit 1711, the first device administration application unit 1710 is equipped with a first information administration unit 1712 and a first driver storage unit 1713. The first information administration unit 1712 is a data storage medium such as a database operating in the first storage unit 1500. The first driver storage unit 1713 consists of a virtual directory medium such as a file transfer protocol (FTP) or a hypertext transfer protocol (HTTP) operating in the first storage unit 1500. As shown in FIG. 1, in this exemplary embodiment, the first driver administration control unit 1711 in the first device administration application unit 1710 controls the first information administration unit 1712 and the first driver storage unit 1713, so that it is shown in the first data control unit 1700 for the sake of convenience.

Next, the first driver administration control unit 1711 has the ability to execute a driver task such as printer addition or driver update with respect to a third driver administration service unit 3710 operating in the client device 3000. Here, the third driver administration service unit 3710 of the client device 3000 is a so-called service program having a driver installing function. It is assumed that the communication between the third driver administration service unit 3710 and the first driver administration control unit 1711 is effected by a Web service utilizing a protocol such as a so-called simple object access protocol (SOAP). Further, the third driver administration service unit 3710 has, as a part of the communication with the first driver administration control unit 1711, a function to acquire a driver stored in the first driver storage unit 1713. The first driver storage unit 1713 is a data storage area for storing the actual condition of a driver, such as an FTP server, an HTTP server, or a file server. On the other hand, the first information administration unit 1712 is a so-called database. The first driver storage unit 1713 and the first information administration unit 1712 maybe in the same server as the administration server 1000 as shown in FIG. 1, or in some other server.

In this exemplary embodiment, the first driver administration unit 1711 has the following functions. First, the first driver administration unit 1711 serves as a device information acquisition unit for acquiring device information on the device 2000 (printing apparatus). Further, the first driver administration unit 1711 is a printing apparatus selection unit for selecting an arbitrary printing apparatus from among a plurality of devices 2000 (printing apparatuses). Furthermore, the first driver administration unit 1711 is a driver information acquisition unit which temporarily stores device information on the printing apparatus acquired by the device information acquisition unit and then acquires driver information on an associated driver. In addition, the first driver administration unit 1711 is a unit for determining a number of selected printing apparatus, which determines whether the number of printing apparatuses selected by the printing apparatus selection unit is plural or not. Further, the first driver administration unit 1711 is an association value setting unit which, when the number of printing apparatuses as determined by the unit for determining a number of selected printing apparatus is singular, sets an association value for establishing an association between the selected printing apparatus and the printing language of the printing apparatus, for example, an association mode flag value. The association value is not restricted to a digital value like a mode flag value; it may be any type of value as long as it is a value expressing the degree of association. Further, the first driver administration unit 1711 serves as a driver selection unit for selecting an association driver with respect to the selected printing apparatus. Further, the first driver administration unit 1711 serves as an association information setting unit for setting association information based on the driver information on the driver selected by the driver selection unit. Still further, the first driver administration unit 1711 serves as an association information registration unit for registering the association information set by the association information setting unit. Further, the first driver administration unit 1711 serves as a client device selection unit selecting a client device in which the driver information is to be installed by referring to the association mode flag value set by the association value setting unit, and the association information registered by the association information registration unit.

Further, the first driver administration control unit 1711 serves as a printing apparatus type determining unit which, when the number of printing apparatuses as determined by the unit for determining a selected printing apparatus number is plural, determines whether the selected printing apparatuses are of the same type by referring to device information on the selected printing apparatuses. Further, the first driver administration unit 1711 serves as a printing language determining unit which, when the plurality of printing apparatuses determined by the printing apparatus type determining unit are determined to be of the same type, determines, from the device information, whether the selected printing apparatuses have the same printing language. In particular, when the plurality of printing apparatuses determined by the printing language determining unit have the same printing language, the association value setting unit sets an association mode flag value for establishing an association between the plurality of selected printing apparatuses and one printing language.

In addition, in particular, when the plurality of printing apparatuses determined by the printing language determining unit do not have the same printing language, the association value setting unit sets an association mode flag value for establishing an association between the plurality of selected printing apparatuses and a plurality of printing languages. The driver selection unit selects appropriate driver information for each selected printing apparatus.

Figure 2:
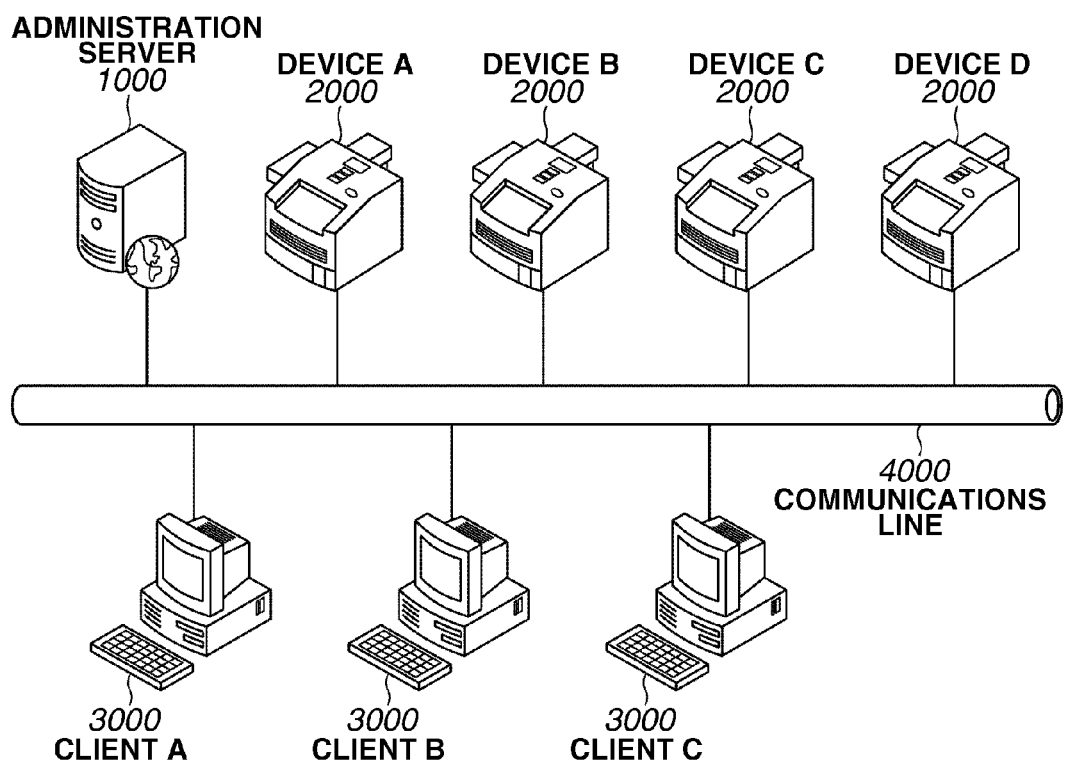
FIG. 2 illustrates an example of the network configuration of a printing system including an information processing apparatus according to the present invention.

Next, an operation example of the information processing apparatus (administration server) of this exemplary embodiment will be shown. FIG. 2 illustrates a network configuration example of a printing system, showing an operation example of the information processing apparatus (administration server) of the first exemplary embodiment. The example shown in FIG. 2 is formed by the administration server 1000, four devices 2000 of "Devices A/B/C/D," and three client devices 3000 of "Clients A/B/C." In this exemplary embodiment, there are shown association preparation for distributing a driver corresponding to "Devices B/C/D" from the administration server 1000 to "Client A," which is a client device 3000, and an example related to the selection thereof. Further, in this exemplary embodiment, there are shown association preparation for distributing a driver corresponding to "Device A" from the administration server 1000 to "Client B," which is a client device 3000, and an example related to the selection thereof.

Next, device information related to the device 2000 will be described. FIG. 3 is a table showing an example of the device information about the devices 2000 shown in FIG. 2. Here, a list of the items of device information related to the "Devices A/B/C/D," is shown, which are devices 2000. These items of device information are previously registered in the first information administration unit 1712 of the administration server 1000.

For example, in the case of "Device A," the device name "Device A" is set in the [Device Name] section, and the product name "Product A" is set in the [Product Name] section. Further, in the case of "Device A, " the Internet Protocol (IP) address "111.222.333.1" is set in the [IP Address] section; the PDL name of "PCL/PS" is set in the [PDL] section; and the setting location of "Room A-1" is set in the [Location] section. Here, the [Product Name] is a name set by the manufacturer of "Device A." On the other hand, the [Device Name] is a name allowing distinction between devices 2000 of the same [Product Name]; it can be freely set by the user. The relationship between them is well known in the art.

The [IP Address] is an address that can be utilized when transmitting printing data from a client device 3000; it is used as an output port utilized by the driver at the third data control unit of the client device 3000. While in this exemplary embodiment an IPv4 type IP address is used, it is also possible to use an IP address of some other type, e.g., an IPv6 type one.

Next, [PDL] means page definition language forming printing data; "Device A" is equipped with two PDLs of "PCL" and "PS." This means "Device A" is capable of processing both printing data formed by PCL and printing data formed by PS. On the other hand, "Device B," "Device C," and "Device D" are devices in which only "PCL" is incorporated as the [PDL]. Specific PDL versions exist for both "PCL" and "PS"; in the case, for example, of "PCL," PCL5e, PCL5c, PCL6, etc. exist. In this exemplary embodiment, they are not distinguished from each other, but are simply referred to as "PCL" and "PS."

Finally, [Location] is information indicating the place where the device concerned is set. For example, "Device A" is set at the location "Room A-1." This also applies to "Device B," "Device C," and "Device D." These items of device information can be acquired as part of the above-mentioned MIB.

Next, driver information used in the information processing apparatus (administration server) of this exemplary embodiment will be described. FIG. 4 is a table showing an example of the driver information used in the information processing apparatus (administration server) of the first exemplary embodiment. The entity of these items of driver information is stored in the first driver storage unit 1713 of the administration server 1000, and information thereon constitutes driver set information corresponding to the devices 2000 administered in the first information administration unit 1712. In this exemplary embodiment, "Driver Set A" and "Driver Set B" are stored and administered as the driver sets. "Driver A" is a PCL driver allowing the devices 2000 to be used for "Product A" or "Product B"; it is a driver in an English version whose driver version is "1.00." The driver name for "Product A" is "PCL Driver for Product A." On the other hand, the driver name for "Product B" is "PCL Driver for Product B." These driver names are values defined in information files (INF) of the driver sets. Usually, these driver names are printer names displayed on printer folders, etc. when the drivers are installed. It is possible to separately set names different from the driver names as the printer names, which is well known in the art. The printer folder mentioned above is a generic name for the folder names of a list of drivers installed; as is well known to those skilled in the art, it may have some other name depending on the operating system (OS). Similarly, "Driver Set B" is a PS driver allowing the devices 2000 to be used for "Product A"; it is a driver in an English version whose driver version is "2.00." The driver name for "Product A" is "PS Driver for Product A."

Next, the state in which the drivers of the devices have been installed in the client devices 3000 will be described. FIG. 5 is a diagram showing an example of the screen displayed on the third display unit 3100 of a client device 3000 after the driver of each device has been installed.

FIG. 5A shows the driver installing result of "Client A," which is a client device 3000. FIG. 5B shows the driver installing result of "Client B," which is a client device 3000. The output destination, [Output Device], is "Device B"; it may also be an output port value generated from the [IP Address] shown in FIG. 3. It can be seen from these diagrams that the relationship between "Device A," "Device B," and "Device C" and the driver installed in "Client A" is [N:1] (N is a natural number). Similarly, FIG. 5C shows the installing result of the driver corresponding to "Device A" shown in FIG. 3, in "Client B," which is a client device 3000. Thus, it can be seen that the relationship between "Device A," which is a device 2000 shown in FIG. 3, and the driver installed in "Client B" is [1:N].

In this way, when the relationship between the device and the driver is [N:1] with respect to "Client A," it is possible to easily realize driver installation also with respect to "Client B" when the relationship between the device and the driver is [1:N].

Figure 6:
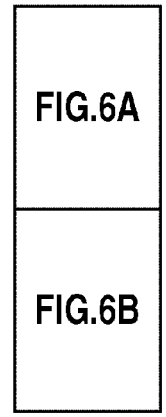
FIG. 6 (including FIG. 6A and FIG. 6B) is a flowchart illustrating control procedures for the information processing apparatus.
Figure 6A:
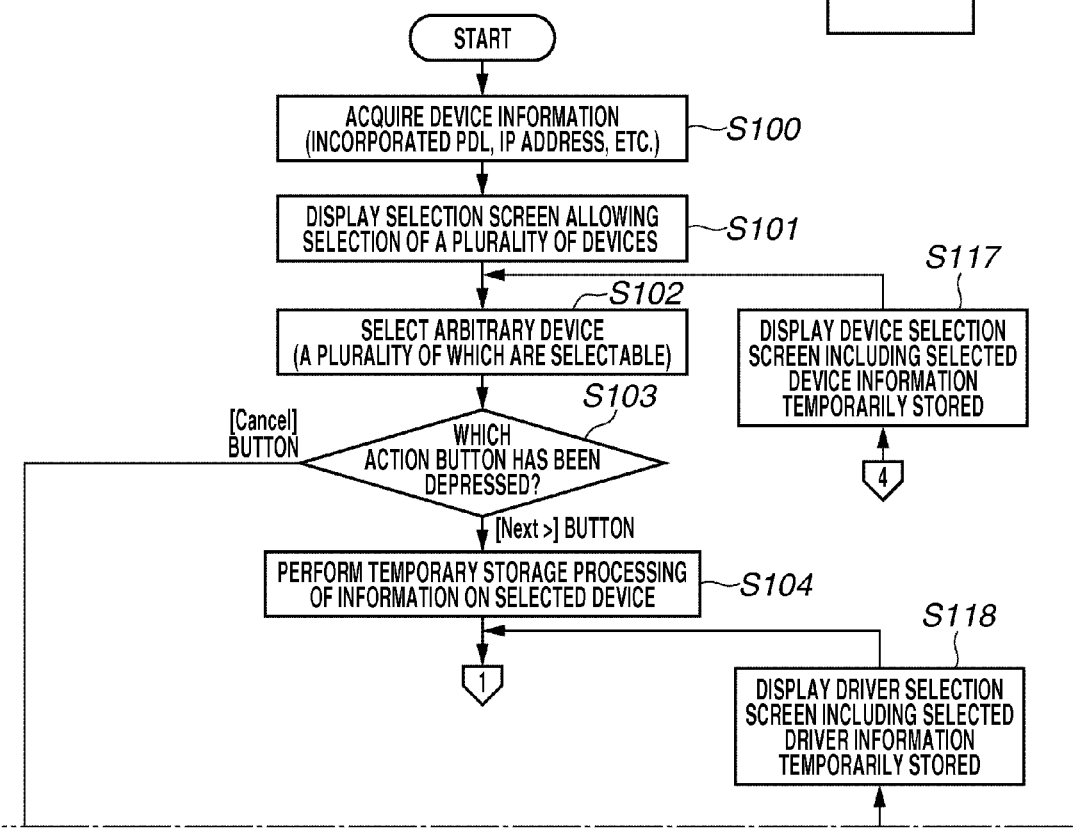
Figure 6B:
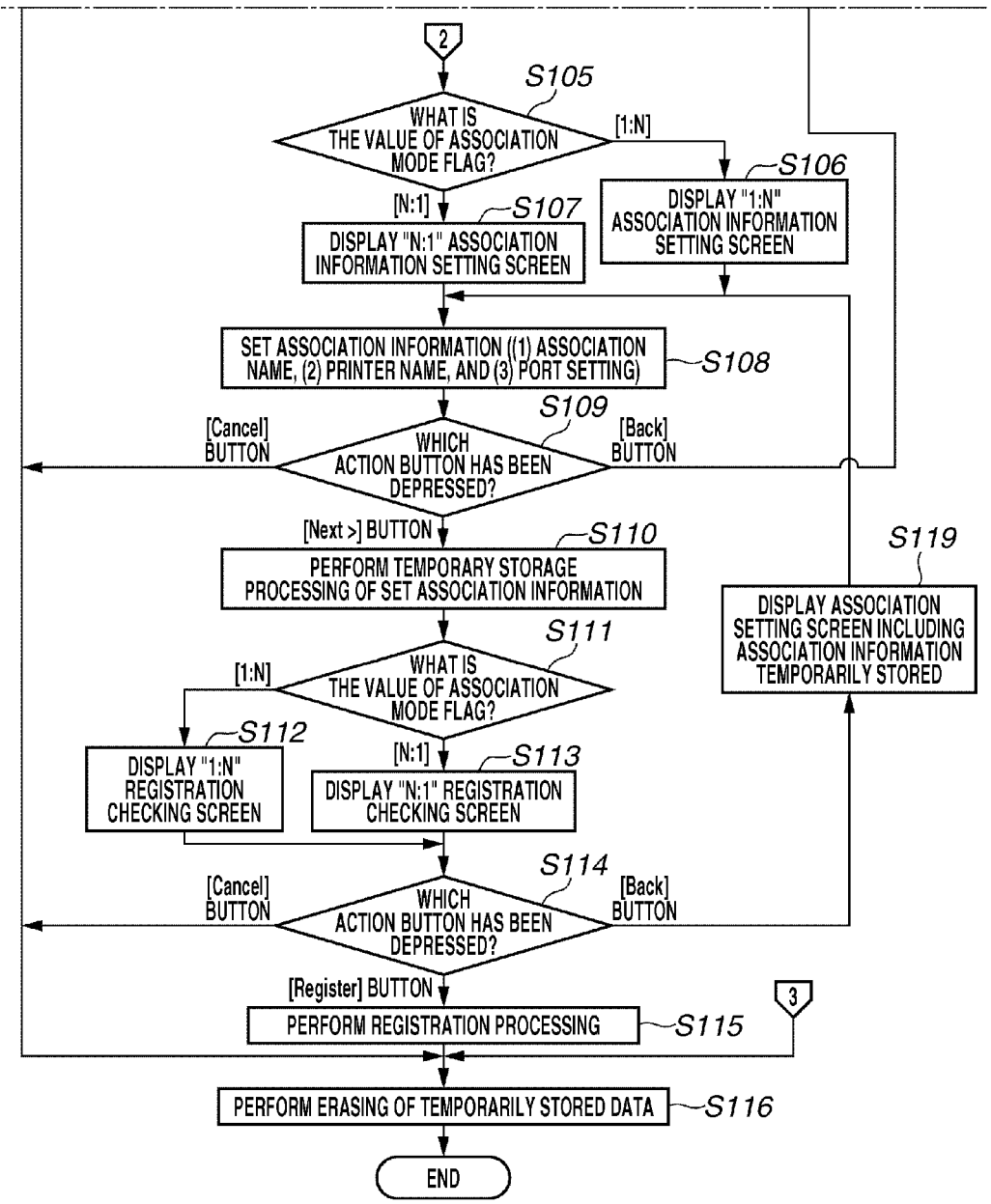

Next, the control of the information processing apparatus (administration server) of this exemplary embodiment will be described in detail. FIGS. 6 (including FIG. 6A and FIG. 6B), 7, and 8 are flowcharts showing control procedures for the information processing apparatus (administration server) of the first exemplary embodiment. Here, association preparation procedures at the first driver administration control unit 1711 of the administration server 1000 are shown.

In the flowchart of FIG. 6, (including FIG. 6A and FIG. 6B), first, the first driver administration control unit 1711 (device information acquisition unit) makes access to the first information administration unit 1712 to acquire device information (step S100). The device information acquired here means the information as shown in FIG. 3 with respect to "Device A," "Device B," "Device C," and "Device D" (See FIG. 2), which are devices 2000.

Next, the first driver administration control unit 1711 displays a selection screen allowing selection of a plurality of devices as shown in FIG. 9A on the first display unit 1100 via the first data control unit 1700 (step S101). As shown in FIG. 9A, the selection screen allowing selection of a plurality of devices includes the screen information: [Associate Device and Driver] and [[Step1] Select Devices]. Further, the selection screen includes a [Next>] button, a [Cancel] button, and the above device information acquired. Here, the [Next>] button is a button for transition to the next processing screen, and the [Cancel] button is a button for rejecting processing on the present screen.

Next, the first driver administration control unit 1711 (printing apparatus selection unit) selects an arbitrary device (printing apparatus) via the first input unit 1200 (step S102). Here, as shown in FIG. 9A, it is assumed that the first driver administration control unit 1711 selects the three devices 2000 of "Device B, "Device C," and "Device D."

Next, the first driver administration control unit 1711 determines the button action from the first input unit 1200 with respect to FIG. 9A (step S103). Here, when the [Cancel] button is clicked on, the procedure advances to step S116. This processing will be described below.

When the [Next>] button is clicked on in step S103, the first driver administration control unit 1711 temporarily stores in the first storage unit 1713 device information about the device selected in step S102 (step S104). Subsequently, the procedure advances to the flowchart of FIG. 7.

Figure 7:
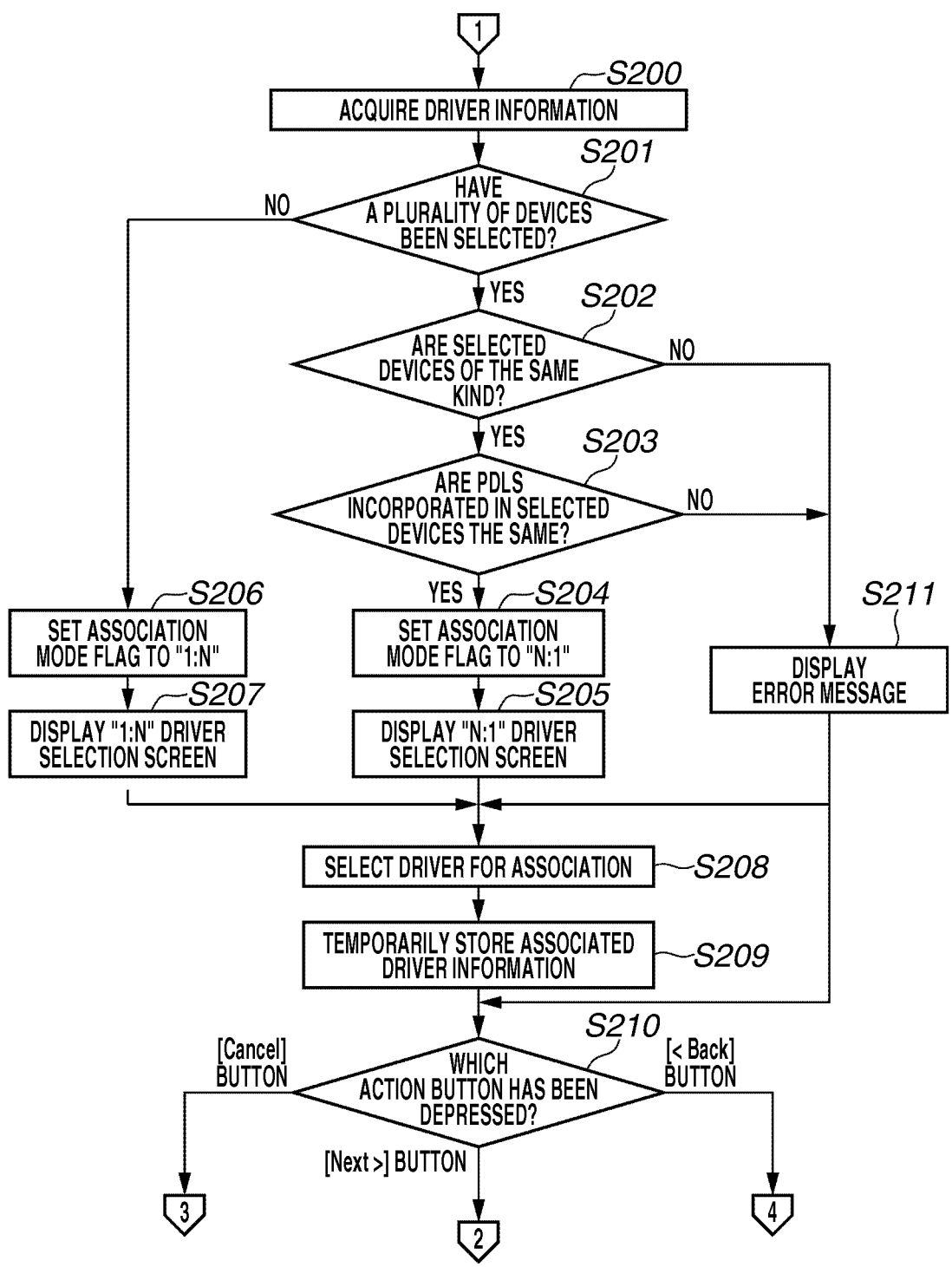
FIG. 7 is a flowchart illustrating control procedures for the information processing apparatus.

Next, in the flowchart of FIG. 7, the first driver administration control unit 1711 (driver information acquisition unit) makes access to the first information administration unit 1712 to acquire driver information (step S200).

Next, the first driver administration control unit 1711 (unit for determining a number of selected printing apparatus) determines whether the number of devices selected instep S102 is plural or not (step S201). Here, when the number of devices selected is singular (NO in step S201), the first driver administration control unit 1711 (mode flag value setting unit) stores the association mode flag as [1:N] in the first information administration unit 1712 (step S206). For example, suppose, as shown in FIG. 9B, the first driver administration control unit 1711 selects solely "Device A" via the first input unit 1200. Subsequently, the first driver administration control unit 1711 displays in the first display unit 1200 a driver selection screen for [1:N] (See FIG. 10B), which allows selection of a plurality of drivers including the driver information acquired in step S200 (step S207). Suppose, for example, the first driver administration control unit 1711 selects, via the first input unit 1200, the driver "PCL Driver for Product A" of the driver set "Driver Set A" with respect to the previously selected "Device A." Similarly, suppose the first driver administration control unit 1711 selects, via the first input unit 1200, the driver "PS Driver for Product A" of the driver set "Driver Set B" with respect to "Device A." After this, the procedure advances to step S208.

On the other hand, when the number of devices selected in step S201 is plural (YES in step S201), the following processing is executed. The first driver administration control unit 1711 (printing apparatus type determining unit) determines whether the selected devices are devices of the same type from the device information selected in step S102 (step S202). As described with reference to FIG. 3, when the devices are of the same type, it means that the [Product Name] included in the device information is the same. For example, as shown in FIG. 3, "Device B," "Device C," and "Device D" are of the same [Product Name], so that they are determined to be devices of the same type. Instead of the example of FIG. 3, it is also possible for the first driver administration control unit 1711 to determine the [Product Name], which is display information of FIG. 9A. Here, when all the selected devices are not of the same type (NO in step S202), the first driver administration control unit 1711 displays in the first display unit 1200 an error message indicating inconsistency in the plurality of devices selected (step S211). After this, the procedure advances to step S210.

On the other hand, when the devices selected in step S202 are of the same type (YES in step S202), the procedure advances to step S203. In step S203, the first driver administration control unit 1711 (printing language determining unit) determines whether the selected devices are devices of the same PDL from the device information selected in step S102. When the devices are of the same PDL, it means that the [PDL] is the same in the device information shown in FIG. 3. For example, it can be seen from FIG. 3 that "Device B," "Device C," and "Device D" are of the same [PDL], so that they are determined to be devices of the same PDL. Instead of the example of FIG. 3, it is also possible for the first driver administration control unit 1711 to determine the [PDL] which is the display information in FIG. 9A. Here, when the PDLs incorporated in the selected devices are not the same (NO in step S203), the first driver administration control unit 1711 displays on the first display unit 1200 an error message indicating inconsistency in the plurality of devices selected (step S211). After this, the procedure advances to step S210.

When the PDLs incorporated in the devices selected in step S202 are the same (YES in step S203), the first driver administration control unit 1711 stores the association mode flag as [N:1] in the first information administration unit 1712 (step S204). Next, the first driver administration control unit 1711 displays the driver selection screen for [N:1] (step S205). Here, the first driver administration control unit 1711 displays on the first data display unit 1100 the driver selection screen for [N:1] (See FIG. 10A) in which the number of drivers allowing selection is singular, including the driver information acquired by the processing in step S200. Here, the [<Back] button shown in FIG. 10A is a button for transition to the screen of FIG. 9A, which is the preceding screen; the other buttons and captions are similar to those of FIG. 9A.

Next, the first driver administration control unit 1711 (driver selection unit) selects the association driver via the first input unit 1200 (step S208). As shown in FIG. 10A, in this exemplary embodiment, a driver whose [Driver Name] is "PCL Driver for Product B" is selected. Next, the first driver administration control unit 1711 temporarily stores the driver information about the driver selected in step S208 in the first information administration unit 1712 (step S209). Subsequently, the first driver administration control unit 1711 determines the button action from the first input unit 1200 with respect to FIG. 10A (step S210). Here, when the [Next>] button is clicked on, the procedure advances to step S105 of FIG. 6. When the [Cancel] button is clicked on, the procedure advances to step S116 of FIG. 6. When the [<Back] button is clicked on, the procedure advances to step S117 of FIG. 6.

When the [Next>] button is clicked on in step S210, the first driver administration control unit 1711 determines whether the value of the association mode flag stored in the first information administration unit 1712 is [N:1] or [1:N] (step S105).

When, in step S105, the value of the association mode flag is [N:1], the first driver administration control unit 1711 displays a association information setting screen for [N:1] (step S107). More specifically, the first driver administration control unit 1711 displays a association information setting screen for [N:1] as shown in FIG. 11A on the first display unit 1100 via the first data control unit 1700. The captions and buttons in FIG. 11A are similar to those of FIGS. 9A and 10A. The association information setting screen for [N:1] in FIG. 11A is a screen for setting the association names and printer names for the selected devices and drivers. The [Set Association Name]—[Association Name] in FIG. 11A is an association name. Subsequently, the first driver administration control unit 1711 performs the setting of association information (step S108). In this example, the first driver administration control unit 1711 sets the association name "Room A-1/A-2/A-3—Product B" via the first input unit 1200. The [Printer Settings]—[Device Information] and [Driver Information] in FIG. 11A indicate information about the devices and drivers selected in FIGS. 9A and 10A. Further, the [Printer Settings]—[Driver Information]—[Printer Name] are printer names displayed on printer folders or the like when drivers are distributed. In this exemplary embodiment, the first administration control unit 1711 sets "PCL Driver for Device B—Room A-2" via the first input unit 1200 as the printer name of the driver with respect to "Device B." Similarly, the first driver administration control unit 1711 sets "PCL Driver for Device C—Room A-3" as the printer name of the driver corresponding to "Device C" via the first input unit 1200. Further, the first driver administration control unit 1711 sets "PCL Driver for Device D—Room A-4" as the printer name of the driver corresponding to "Device D" via the first input unit 1200.

On the other hand, when the value of the association mode flag is [1:N] in step S105, the first driver administration control unit 1711 displays a association information setting screen for [1:N] (step S106). More specifically, the first driver administration control unit 1711 displays a association information setting screen for [1:N] as shown in FIG. 11B on the first display unit 1100. Subsequently, the setting of association information is executed (step S108). As shown in FIG. 11B, in this example, the first driver administration control unit 1711 (association information setting unit) sets the association name "Room A-1—Product A—Device A" via the first input unit 1200. Further, the first driver administration control unit 1711 sets "PCL Driver for Device A—Room A-1" as the printer name of the driver "PCL Driver for Product A" with respect to "Device A." Similarly, the first driver administration unit 1711 sets "PS Driver for Device A—Room A-1" as the printer name of the driver "PS Driver for Product A" with respect to "Device A." After this, the procedure advances to step S108.

Next, the first driver administration control unit 1711 determines the button action from the first input unit 1200 with respect to FIG. 11A (step S109). Here, when the [Next>] button is clicked on, the procedure advances to step S110. When the [Cancel] button is clicked on, the procedure advances to step S116. When the [<Back] button is clicked on, the procedure advances to step S118.

When the [Next>] button is clicked on in step S109, the first driver administration control unit 1711 temporarily stores the set association information (See FIG. 11A) in the first information administration unit 1712 (step S110). Next, as in the processing of step S105, the first driver administration unit 1711 determines whether the value of the association mode flag stored in the first information administration unit 1712 in the processing of step S204 is [N:1] or [1:N] (step S111).

When the value of the association mode flag is [N:1] in step S111, the first driver administration control unit 1711 displays on the first display unit 1100 a association information registration checking screen for [N:1] as shown in FIG. 12A (step S113). In FIG. 12A, the association information set in FIGS. 9A, 10A, and 11A is collectively displayed. On the other hand, when the value of the association mode flag is [1:N] in step S111, the first driver administration control unit 1711 displays a registration checking screen for [1:N] (step S112). More specifically, the first driver administration control unit 1711 displays on the first display unit 1100 an association information registration checking screen for [1:N] as shown in FIG. 12B. In FIG. 12B, the association information set in FIGS. 9B, 10B, and 11B is collectively displayed.

Next, the first driver administration control unit 1711 determines the button action from the first input unit 1200 with respect to FIGS. 12A and 12B (step S114). Here, when the [Register] button is clicked on, the procedure advances to step S115. When the [Cancel] button is clicked on, the procedure advances to step S116. When the [<Back] button is clicked on, the procedure advances to step S119. The [Register] button shown in FIGS. 12A and 12B is a button for storing set association information in the first information administration unit 1712. The other buttons and captions are similar to those of FIGS. 9A, 9B, 10A, 10B, 11A, and 11B.

When the [Register] button is clicked on in step S114, the first driver administration control unit 1711 (association information registration unit) registers the set association information in the first information administration unit 1712 (step S115). And, the temporarily stored data is erased (step S116). Here, the first driver administration control unit 1711 erases the data temporarily stored in the first information administration unit 1712 by the processing in step S104, step S209, and step S110.

When the [<Back] button is clicked on in step S210, the first driver administration unit 1711 displays a device selection screen including the temporarily stored device information (step S117). More specifically, the first driver administration control unit 1711 displays a device selection screen (See FIGS. 9A and 9B) including the device information temporarily stored in the first information administration unit 1712 by the processing in step S104. After this, the procedure returns to step S102.

When the [<Back] button is clicked on in step S109, the first driver administration control unit 1711 displays a driver selection screen (See FIGS. 10A and 10B) including the driver information temporarily stored in the first information administration unit 1712 (step S118). After this, the procedure returns to step S200.

When the [<Back] button is clicked on in step S114, the first driver administration control unit 1711 displays an association information setting screen (See FIGS. 10A and 10B) including the association information temporarily stored in the first information administration unit 1712 (step S119). After this, the procedure returns to step S108.

Figure 8:
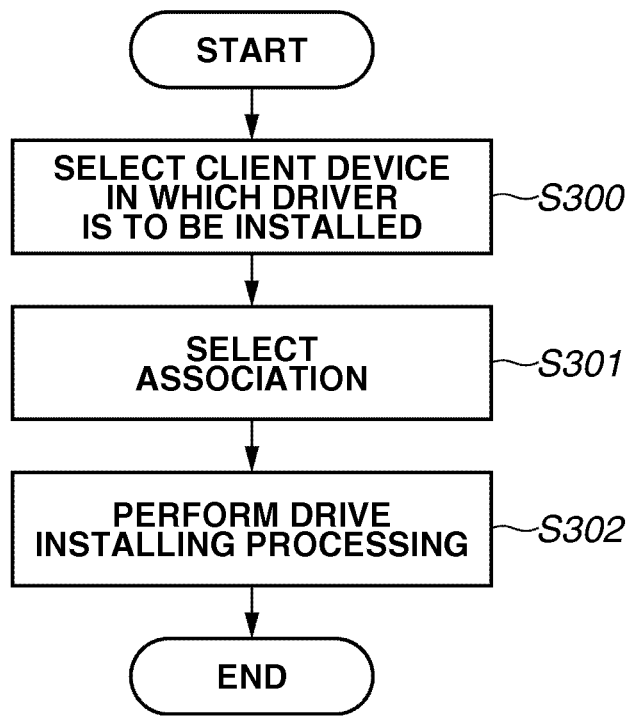
FIG. 8 is a flowchart illustrating control procedures for the information processing apparatus.

An associated driver prepared by the above processing is installed in an arbitrary client device 3000. In this processing, using the prepared association, the first driver administration control unit 1711 requests the third driver administration service unit 3710 of an arbitrary client device 3000 to perform driver installing processing. FIG. 8 is a flowchart showing the procedures by which the driver installing in the client device 3000 is performed.

In the flowchart of FIG. 8, the first driver administration control unit 1711 (client device selection unit) selects a client device in which a driver is to be installed (step S300). For example, the first driver administration control unit 1711 selects "Client A" of FIG. 2 as the client device 3000 in which a driver is to be installed via the first display unit 1100 and the first input unit 1200. Alternatively, the first driver administration control unit 1711 selects "Client B" of FIG. 2 as the client device 3000 in which a driver is to be installed via the first display unit 1100 and the first input unit 1200.

Next, the first driver administration control unit 1711 selects an association (step S301). For example, the first driver administration control unit 1711 displays an association selection screen for [N:1] as shown in FIG. 13A via the first display unit 1100. According to the selection screen, the previously registered association "Room A-1/A-2/A-3—Product B" is selected via the first input unit 1200. The [Register] button in FIG. 13A is a button for urging the third driver administration service unit 3710 to install a driver; the captions are similar to those of FIGS. 9A and 10A. Alternatively, the first driver administration control unit 1711 displays the association selection screen for [1:N] shown in FIG. 13B via the first display unit 1100, and selects the previously registered association "Room A-1—Product A—Device A" via the first input unit 1200. The [Register] button in FIG. 13B is a button for urging the third driver administration service unit 3710 to perform driver installing; the captions are similar to those of FIGS. 9B and 10B.

And, the first driver administration control unit 1711 executes a driver installing processing (step S302). Here, as described above, the first driver administration control unit 1711 gives an instruction to install a driver in the third driver administration service unit 3710 of the client device 3000. As a result, the first driver administration control unit 1711 prepares and selects, for example, a [N:1] association, whereby it is possible to easily install in "Client A" a driver corresponding to "Device B/C/D" as shown in FIG. 8A. Further, by preparing and selecting a [1:N] association, the first driver administration control unit 1711 can easily install in [Client B] a driver corresponding to "Device A" shown in FIG. 8B.

According to this exemplary embodiment, by executing the above-described processing, it is possible to prevent an error in the selection of various associations and to promote simplification in procedures when preparing a task at the time of driver installation in a client device, making it possible to achieve a reduction in total cost of ownership (TCO). In particular, regarding the association between device and driver serving as the selection unit when distributing a driver corresponding to a device to a client device from an administration server, it is possible to prepare and select [N:1] and [1:N] associations instead of the 1:1 correspondence as used in the related art. As a result, an erroneous selection of an association is mitigated, and the procedures at the time of selection are simplified, thereby achieving a reduction in total cost of ownership (TCO).

Next, a second exemplary embodiment of the present invention will be described. In this exemplary embodiment, an association for distributing a driver corresponding to "Device A" and "Device B" is prepared and selected from the administration server 1000 shown in FIG. 2 to "Client C," which is a client device 3000. FIG. 5C is a diagram showing the driver installing result for "Client C," which is a client device 3000, in the case in which this exemplary embodiment is applied. More specifically, it can be seen that the relationship between "Device A" and "Device B," which are devices 2000 as shown in FIG. 2, and the driver installed in "Client C," which is a client device 3000, is [N:N] (N is a natural number). In the following, the control of the information processing apparatus of this exemplary embodiment (administration server) will be described in detail. The system configuration of the printing system including the administration server 1000 is similar to that of the first exemplary embodiment.

Figure 14:
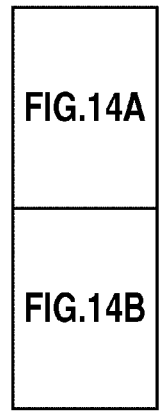
FIG. 14 is a flowchart illustrating control procedures for an information processing apparatus according to the present invention.
Figure 14A:
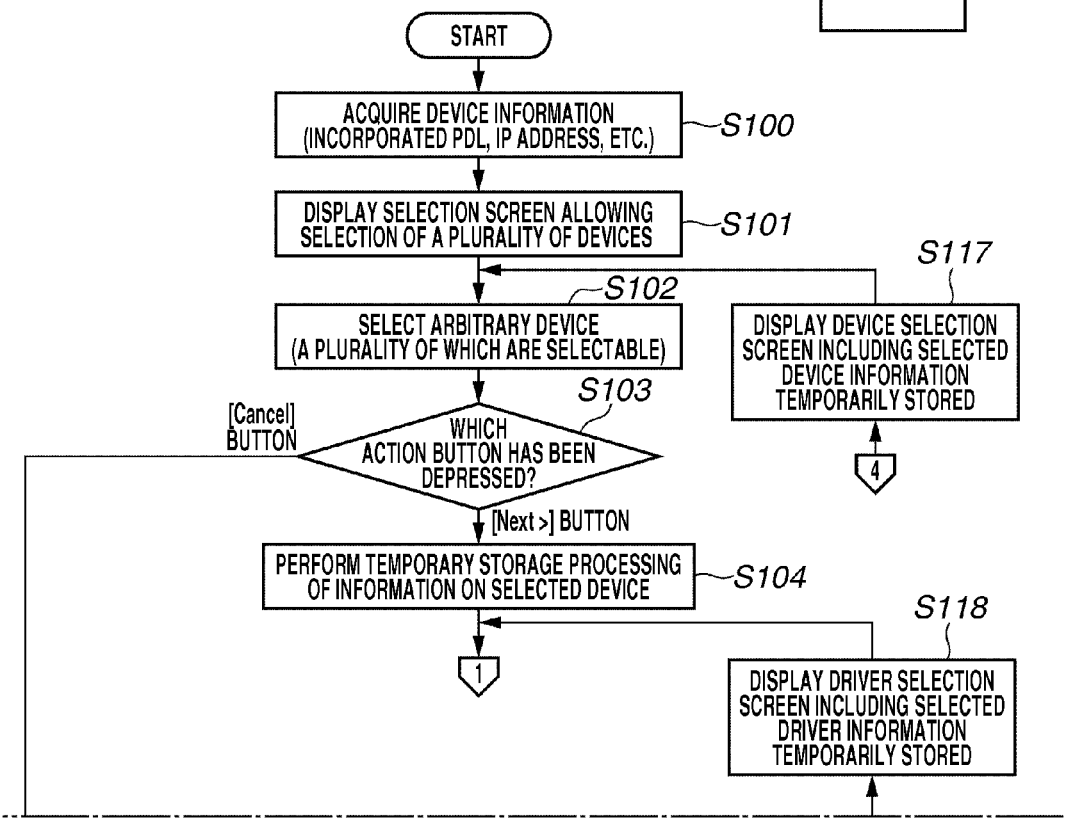
Figure 14B:
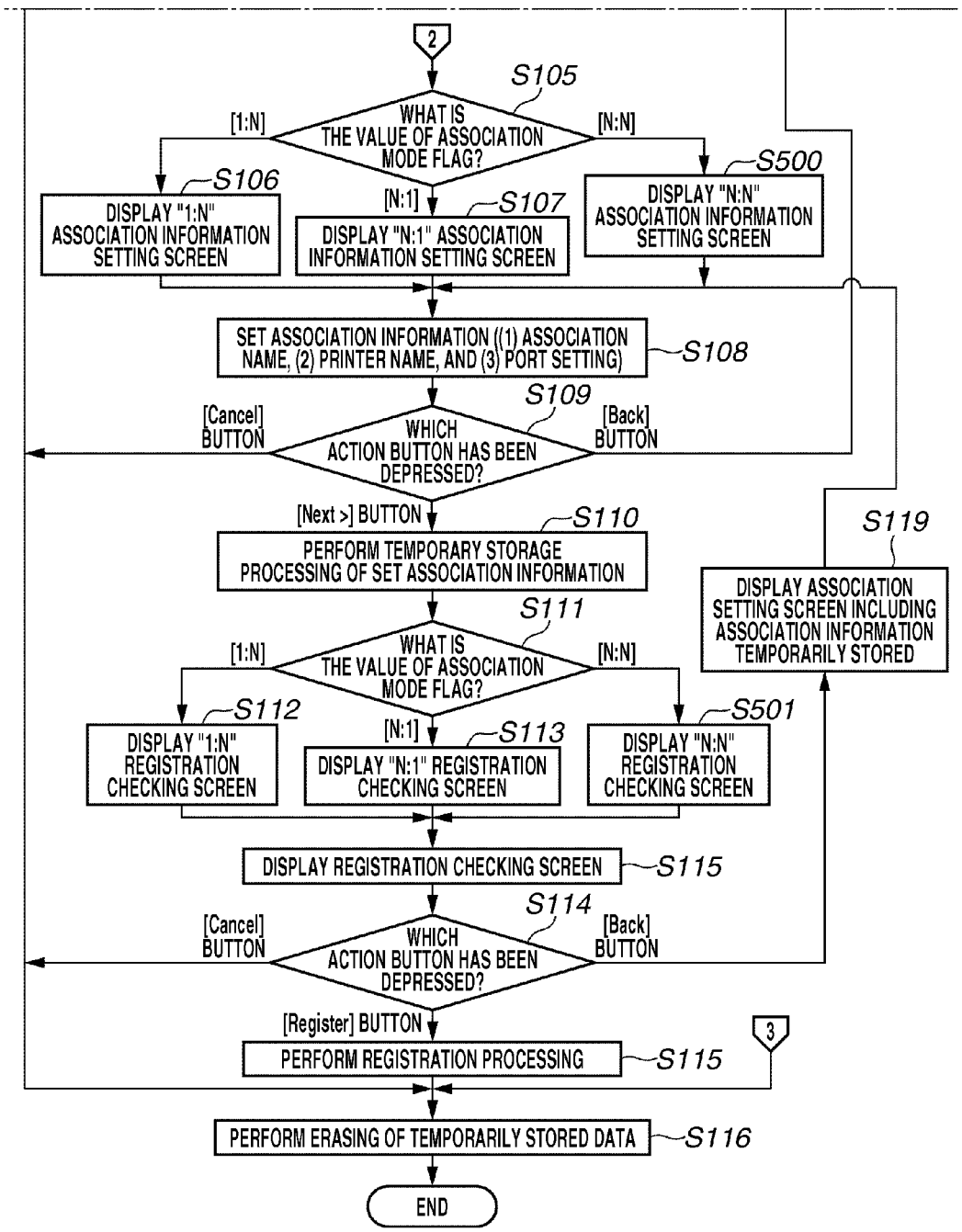

FIGS. 14 and 15 are flowcharts illustrating control procedures for the information processing apparatus (administration server) of the second exemplary embodiment. Here, the association preparation procedures of the first driver administration control unit 1711 of the administration server 1000 are shown. In the following, only procedures different from those of the first exemplary embodiment will be illustrated. In the flowchart of FIG. 14, steps S500 and S501 are added to the flowchart of FIG. 6. In the flowchart of FIG. 15, the processing of steps S400 and S401 is conducted instead of the processing of step S211 of FIG. 15, and the procedures of steps S402 through S405 are newly added.

In this exemplary embodiment, after the procedures of steps S100 through S104 shown in FIG. 14 have been completed, the procedures from step S200 onward shown in FIG. 15 are sequentially executed. When all the devices selected in step S202 are not of the same type (NO in step S202), the first driver administration control unit 1711 sets the association mode flag to [N:N] (step S400). More specifically, when the devices selected in the processing of step S201 are not of the same type (See FIG. 9C), the first driver administration control unit 1711 sets the association mode flag to [N:N], and stores this in the first information administration unit 1712. Also when the PDLs incorporated in the devices selected in step S203 are not the same (NO in step S203), the first driver administration control unit 1711 sets the association mode flag to [N:N] (step S400). Here, when the PDLs incorporated in the devices selected in the processing of step S203 are not the same (See FIG. 9C), the first driver administration control unit 1711 sets the association mode flag to [N:N], and stores this in the first information administration unit 1712.

Next, the first driver administration control unit 1711 displays a driver selection screen for [N:N] (step S401). Here, the first driver administration control unit 1711 displays on the first display unit 1100 a driver selection screen for [N:N] as shown in FIG. 10C. FIGS. 10C and 10D show an example of a screen for selecting a driver for each selected device associated due to a difference in the type of the devices selected and PDL. More specifically, FIG. 10C is a screen for selecting an association driver with respect to "Device A," and FIG. 10D is a screen for selecting an association driver with respect to "Device B." Here, for example, the first driver administration control unit 1711 selects the driver "PCL Driver for Product A" of the driver set "Driver Set A" with respect to "Device A" shown in FIG. 10C. Further, the first driver administration control unit 1711 selects the driver "PS Driver for Product A" of the driver set "Driver Set B." Similarly, as shown in FIG. 10D, the first driver administration control unit 1711 selects the driver "PCL Driver for Product B" with respect to "Device B."

When the [Next>] button is clicked on in step S210, the first driver administration control unit 1711 determines whether the association mode flag is in the [N:N] mode or not (step S402). Here, when the association mode flag is not in the [N:N] mode (NO in step S402), the procedure advances to step S105. On the other hand, when the association mode flag is in the [N:N] mode (YES in step S402), the first driver administration control unit 1711 acquires an associated driver and device information from the first information administration unit 1712 (step S403). And, the first driver administration control unit 1711 determines whether an association driver is selected or not for each selected device (step S404). Here, when an association driver is selected for each selected device (YES in step S404), the procedure advances to step S105. On the other hand, when no association driver is selected for each selected device (NO in step S404), the first driver administration control unit 1711 informs of the existence of a device with which no driver is associated (step S405). And, a driver selection screen of a device is displayed with which no driver is associated (step S406). Here, the first driver administration control unit 1711 displays on the first display unit 1100 a driver selection screen for [N:N] in which the top screen shows a device with which no driver is associated. For example, in this exemplary embodiment, when no driver is associated with the selected device 2000, "Device B," the screen as shown in FIG. 10D is displayed. When no drivers are associated with a plurality of devices, it is also possible to display at the top the driver selection screen of an arbitrary device with which no driver is associated, effecting notification through, for example, a change in the tab color of the driver with which no driver is associated. After this, the procedure advances to step S208.

When the value of the association mode flag is [N:N] in step S105 of the flowchart shown in FIG. 14, the first driver administration control unit 1711 displays an association information setting screen for [N:N] (step S500). More specifically, the first driver administration control unit 1711 displays on the first display unit 1100 an association information setting screen for [N:N] as shown in FIG. 11C. Like FIGS. 11A and 11B, FIG. 11C shows a screen for setting an association name and a printer name with respect to the device selected. The first driver administration control unit 1711 sets the printer name "PCL Driver for Device A—Room A-1" for the driver "PCL Driver for Product A" of the driver set "Device A." Further, the first driver administration control unit 1711 sets the printer name "PCL Driver for Device A—Room A-1" for the driver "PS Driver for Product A" of the driver set "Device A." Similarly, the first driver administration control unit 1711 sets the printer name "PCL Driver for Device B—Room A-2" to the driver "PCL Driver for Product B" with respect to "Device B."

When the value of the association mode flag is [N:N] in step S111, the first driver administration control unit 1711 displays a registration checking screen for [N:N] (step S501). More specifically, the first driver administration control unit 1711 displays on the first display unit 1100 an association information registration checking screen for [N:N] as shown in FIG. 12C. Like FIGS. 12A and 12B, FIG. 12C shows a screen collectively displaying association information set in FIGS. 9C, 9D, 10C, and 11C.

As in the case of the first exemplary embodiment, after the completion of the processing of the flowchart of FIG. 14, the first driver administration control unit 1711 requests the third driver administration service unit 3710 of an arbitrary client device 3000 to perform driver installing processing by using the prepared association. For this processing, the processing as shown in the flowchart of FIG. 8 is executed. In this exemplary embodiment, the first driver administration control unit 1711 selects, via the first input unit 1200, "Client C" in FIG. 2 as the client device 3000 in which a driver is to be installed (step S300 in FIG. 8). Next, the first driver administration control unit 1711 displays an association selection screen as shown in FIG. 13C on the first display unit 1100. And, suppose the first driver administration control unit 1711 selects, via the first input unit 1200, the previously registered association "Room A-1—Device A & Room A-2—Device B" (step 5301 in FIG. 8). As in FIGS. 13A and 13B, the [Register] button in FIG. 13C is a button for urging the third driver administration service unit 3710 to perform driver installation; the captions are similar to those of FIG. 9A. Next, as described above, the first driver administration control unit 1711 gives a driver installing instruction to the third driver administration service unit 3710 of the client device 3000 (step S302 of FIG. 8). As a result, the first driver administration control unit 1711 prepares and selects a [N:N] association, whereby it is possible to easily install a driver corresponding to "Device A" and "Device B" as shown in FIG. 5C in "Client C."

According to this exemplary embodiment, by executing the above-described processing, it is possible to prevent an error in the selection of various associations when preparing a task at the time of installing a driver in a client device, thus promoting simplification in procedures and achieving a reduction in total cost of ownership (TCO)). In particular, regarding an association between device and driver constituting a selection unit when distributing a driver corresponding to a device from an administration server to a client device, it is possible to prepare and select an association [N:N] in addition to the associations [N:1] and [1:N] of the first exemplary embodiment. As a result, it is possible to mitigate erroneous selection of association and to achieve further simplification in the procedures at the time of selection, which leads to a further reduction in total cost of ownership (TCO)).

The steps shown in the above exemplary embodiments can be realized through execution of software (information processing apparatus control programs) acquired via a network or various storage media by a processing apparatus such as a computer (CPU or processor).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-193650 filed Aug. 24, 2009, which is hereby incorporated by reference herein in its entirety.

What is claimed is:

1. An information processing apparatus comprising at least a processor, functioning as:
   a device selection unit configured to select one or more devices from among a plurality of devices;
   a first determining unit configured to determine whether one device is selected or more than one devices are selected by the device selection unit;
   a control unit configured to display a selection screen for allowing selection of one or a plurality of device drivers associating with the one or more selected devices according to a result of the determination by the first determining unit;
   a driver selection unit configured to select the one or the plurality of device drivers through the selection screen;
   a registration unit configured to register information indicating a relation between the one or more selected devices and the selected one device driver or the selected plurality of device drivers prior to an installation process; and
   a client selection unit configured to select a client in which the installation process is performed using the registered information,
   wherein the control unit displays, as the selection screen, a first screen which allows selection of the plurality of device drivers in a case where the first determining unit determines that one device is selected by the device selection unit, and displays, as the selection screen, a second screen which is different from the first screen and allows selection of the one device driver in a case where the first determining unit determines that more than one devices are selected by the selection unit.

2. The information processing apparatus according to claim 1, wherein the processor functions further as:
   a type determining unit configured to determine whether the selected devices are of a same device type in the case where the first determining unit determines that more than one devices are selected; and
   a printing language determining unit configured to determine whether the selected devices have a same printing language in the case where the first determining unit determines that more than one devices are selected,
   wherein the control unit displays a message indicating an error in a case where the selected devices are not of the same device type or where the selected devices does not have the same printing language.

3. The information processing apparatus according to claim 1, wherein the registration unit registers, as the information, name information and port information of the selected devices.

4. The information processing apparatus according to claim 3, wherein the registration unit registers, as the information, the port information of each of the selected devices in the case where the first determining unit determines that more than one devices are selected.

5. The information processing apparatus according to claim 1, wherein the device has at least one of a printing function and a facsimile function.

6. An information processing method performed by a processor in an information processing apparatus, comprising:
   selecting one or more devices from among a plurality of devices;
   determining whether one device is selected or more than one devices are selected;
   displaying a selection screen for allowing selection of one or a plurality of device drivers associating with the one or more selected devices according to a result of the determining;
   selecting the one or the plurality of device drivers through the selection screen;
   registering information indicating a relation between the one or more selected devices and the selected one device driver or the selected plurality of device drivers prior to an installation process; and
   selecting a client, in which the installation process is performed using the registered information, wherein the displaying displays, as the selection screen, a first screen which allows selection of the plurality of device drivers in a case where one device is selected, and displays, as the selection screen, a second screen which is different from the first screen and allows selection of the one device driver in a case where more than one devices are selected.

7. The method according to claim 6, further comprising:
determining whether the selected devices are of a same device type in the case where the selected arbitrary number of devices is plural; and
determining whether the selected devices have a same printing language in the case where more than one devices are selected,
displaying a message indicating an error in a case where the selected devices are not of the same device type or where the selected devices do not have the same printing language.

8. The method according to claim 6, further comprising registering, as the information, name information and port information of the selected devices.

9. The method according to claim 8, further comprising registering, as the information, the port information of each of the selected devices in the case where more than one devices are selected.

10. The method according to claim 6, wherein the device has at least one of a printing function and a facsimile function.

11. A non-transitory computer readable storage medium storing a computer-executable program of instructions for causing a computer to perform a method comprising:
selecting one or more devices from among a plurality of devices;
determining whether one device is selected or more than one devices are selected;
displaying a selection screen for allowing selection of one or a plurality of device drivers associating with the one or more selected devices according to a result of the determining;
selecting the one or the plurality of device drivers through the selection screen;
registering information indicating a relation between the one or more selected devices and the selected one device driver or the selected plurality of device drivers prior to an installation process; and
selecting a client, in which the installation process is performed using the registered information,
wherein the displaying displays, as the selection screen, a first screen which allows selection of the plurality of device drivers in a case where one device is selected, and displays, as the selection screen, a second screen which is different from the first screen and allows selection of the one device driver in a case where more than one devices are selected.

12. The non-transitory computer readable storage medium according to claim 11, further comprising:
determining whether the selected devices are of a same device type in the case where one device is selected; and
determining whether the selected devices have a same printing language in the case where more than one devices are selected,
displaying a message indicating an error in a case where the selected devices are not of the same device type or where the selected devices do not have the same printing language.

13. The non-transitory computer readable storage medium according to claim 11, further comprising registering, as the information, name information and port information of the selected devices.

14. The non-transitory computer readable storage medium according to claim 13, further comprising registering, as the information, the port information of each of the selected devices in the case where more than one devices are selected.

15. The non-transitory computer readable storage medium according to claim 11, wherein the device has at least one of a printing function and a facsimile function.

16. The information processing apparatus according to claim 1,
wherein the processor functions further as a storage unit configured to store information indicative of a correspondence between a plurality of devices and a plurality of device drivers, and
wherein the control unit displays, as the selection screen, the first screen based on the stored information in a case where the first determining unit determines that one device is selected, and displays, as the selection screen, the second screen based on the stored information in a case where the first determining unit determines that more than one devices are selected.

17. The information processing method according to claim 6, further comprising:
storing information indicative of a correspondence between a plurality of devices and a plurality of device drivers, and
displaying, as the selection screen, the first screen based on the stored information in a case where the first determining unit determines that one device is selected, and displaying, as the selection screen, the second screen based on the stored information in a case where the first determining unit determines that more than one devices are selected.

18. The non-transitory computer readable storage medium according to claim 11, further comprising:
storing information indicative of a correspondence between a plurality of devices and a plurality of device drivers, and
displaying, as the selection screen, the first screen based on the stored information in a case where the first determining unit determines that one device is selected, and displaying, as the selection screen, the second screen based on the stored information in a case where the first determining unit determines that more than one devices are selected.

* * * * *